UNITED STATES PATENT OFFICE 2,534,102

LAMINATED GLASS INTERLAYER

Francis T. Buckley and George R. Sido, Springfield, Mass., assignors to Monsanto Chemical Company, St. Louis, Mo., a corporation of Delaware No Drawing. Application October 13, 1947, Serial No. 779,648

10 Claims. (Cl. 154—2.77)

This invention relates to polyvinyl acetal compositions. More particularly, the invention relates to polyvinyl acetal compositions containing alcohol reaction products of aryl sulfonamide-aldehyde condensation products.

Polyvinyl acetal resins made by the condensation of polyvinyl alcohol or partially hydrolyzed polyvinyl esters with aldehydes and ketones have attained prominence as the interlayer for laminated glass and as a means for adhesively uniting various surfaces such as wood, metal, glass, fabrics, paper, etc. They produce a bond between surfaces which is less affected by temperature changes than bonds made by using other synthetic resins. One problem in using the polyvinyl acetal resins has been the attainment of high strength bonds, particularly in the presence of moisture.

One object of this invention is to provide new polyvinyl acetal compositions.

A further object is to increase the adhesive character of polyvinyl acetal resins.

These and other objects are attained by modifying polyvinyl acetal compositions with alcohol reaction products of aryl-sulfonamide-aldehyde condensation products.

Another object is to provide improved laminated glass.

The following examples are given in illustration and are not intended to limit the scope of this invention. Where parts are mentioned, they are parts by weight.

EXAMPLE I 100 parts of a polyvinyl butyral resin containing about 18 to about 20% hydroxyl groups by weight, calculated as polyvinyl alcohol, from about 1 to about 3% acetate groups by weight, calculated as polyvinyl acetate and the balance substantially butyraldehyde acetal groups, were mixed with 22.5 parts of butyl laurate, 22.5 parts of dibutyl phthalate and 3 parts of n-butyl alcohol reaction product of a p-toluene sulfonamide-formaldehyde condensation product. The mixture was kneaded into a homogeneous mass at elevated temperatures and then extruded into a ribbon about .015" thick. The ribbon was laminated between two sheets of glass at elevated temperature and pressure and then tested for adhesion of the glass to the plastic. When the ribbon contained about 0.1% water by weight, an adhesion of 9— was obtained. When the water content was 0.7% by weight, an adhesion of 7— was obtained. Using a similar ribbon containing no sulfonamide derivative, the adhesion at 0.1% water was 8— and at 0.5% water was 6—. The values for adhesion are based on a scale used in the laminated glass industry wherein a reading of 10 is considered perfect adhesion.

In the following table are results of adhesion tests run on compositions similar to that shown in Example I, except that the n-butanol reaction product was replaced by the methyl and 2-ethyl hexyl reaction products, as indicated.

Table I

Para-toluene sulfonamide-formaldehyde condensation product, reacted with:

| | Per cent Water | Adhesion |
|---|---|---|
| Methanol | 0.18 | 9— |
| Blank | 0.14 | 8+ |
| Methanol | 0.52 | 8+ |
| Blank | 0.56 | 5— |
| 2-ethyl hexanol | 0.16 | 9+ |
| Blank | 0.15 | 6+ |
| 2-ethyl hexanol | 0.51 | 7+ |
| Blank | 0.50 | 5— |

From the table, it may be seen that the unmodified compositions lose adhesion rapidly at higher moisture contents, whereas similar compositions containing the alcohol-aryl sulfonamide-aldehyde reaction products lose adhesion only to a relatively slight degree.

The increased adhesion of the plasticized polyvinyl butyral resins containing the alcohol reaction products of aryl sulfonamide-aldehyde condensation products is valuable in the production of laminated glass for use in motor vehicles, airplanes, houses, etc., since it renders the likelihood of injury due to flying glass when the laminate is shattered, extremely remote. In addition, the relatively high adhesion at higher moisture content of the ribbon, facilitates the handling of the ribbon in the laminating process and eliminates the source of a large number of complaints due to defective laminations, which cannot be recognized as defective until some time after installation.

The polyvinyl acetal resins which may be used are prepared by hydrolyzing a polyvinyl ester either completely, or partially, and reacting the hydrolyzed product with an aldehyde or ketone such as formaldehyde, acetaldehyde, butyraldehyde, valeraldehyde, octaldehyde, benzaldehyde, methyl ethyl ketone, etc., or mixtures of the same. U. S. patent to Morrison et al., Reissue No. 20,430, dated June 29, 1937, illustrates suitable methods for preparing such resins. Polyvinyl acetal resins prepared in this manner may have a certain number of ester groups originally present in the vinyl ester, which have not been removed, as well as a certain number of hydroxyl groups which have not been replaced with acetal groups.

According to one embodiment of this invention, the polyvinyl acetal resins employed may be considered to be made up, on a weight basis, of 5–25% hydroxyl groups, calculated as polyvinyl alcohol, 0–40% ester groups, calculated as polyvinyl acetate and the balance substantially acetal.

When the acetal is butyraldehyde acetal, according to one embodiment of this invention, the polyvinyl acetal resin contains, on a weight basis, 10–25% hydroxyl groups, calculated as polyvinyl alcohol, 0–30% acetate groups calculated as polyvinyl acetate, and the balance substantially butyraldehyde acetal.

When the acetal is formaldehyde acetal, according to another embodiment of this invention, the polyvinyl acetal resin may contain, on a weight basis, 5–8% hydroxyl groups, calculated as polyvinyl alcohol, 10–16% acetate groups, calculated as polyvinyl acetate, and the balance substantially formaldehyde acetal.

An example of a polyvinyl acetaldehyde acetal is one containing, on a weight basis, 7% hydroxyl groups calculated as polyvinyl alcohol, 17% acetate groups, calculated as polyvinyl acetate, and the balance substantially acetaldehyde acetal.

Typical of a mixed acetal resin is one which contains, on a weight basis, 13% hydroxyl groups, calculated as polyvinyl alcohol, 2–6% acetate groups calculated as polyvinyl acetate, and the balance acetaldehyde and butyraldehyde acetal groups in a molar ratio of 65–50% acetaldehyde and 35–50% butyraldehyde acetal groups.

The alcohol reaction products of aryl sulfonamide-aldehyde condensation products are new compounds described and claimed in the copending application of G. R. Sido, Serial Number 776,627. They are made by condensing benzene sulfonamide or ring-substituted benzene sulfonamides with an aldehyde in an alkaline medium and then reacting the product with an alcohol or phenol. The aryl sulfonamide-aldehyde-alcohol derivatives range from light colored or water-white viscous liquids having relatively low volatility to wax-like solids. They are compatible with the polyvinyl acetals of this invention.

In one embodiment of this invention, already plasticized polyvinyl acetal resins are modified with the aryl sulfonamide-aldehyde alcohol derivatives in amounts varying from 0.5 to 5% by weight based on the polyvinyl acetal resin.

For laminated glass purposes, the polyvinyl acetal resins may be plasticized with such compounds as triethylene glycol 2-ethyl hexoate, dibutyl sebacate, butyl laurate-dibutyl phthalate combinations, etc. These plasticizers enable the glass manufacturers to obtain laminates having impact strengths which are substantially balanced at low and high temperatures, a valuable property for laminated glass.

The modification of polyvinyl acetal resins with the aryl sulfonamide-aldehyde-alcohol derivatives permits the production of laminates which retain the balanced impact strengths of the unmodified resins and which have the further advantage of nearly perfect adhesion of the glass to the plastic interlayer.

In another embodiment of this invention, the aryl sulfonamide-aldehyde-alcohol derivatives may replace a substantial part or all of the conventional plasticizers in polyvinyl acetal laminating compositions. For example, all of the dibutyl phthalate of Example I may be replaced by the p-toluene sulfonamide-formaldehyde butyl alcohol derivative. Up to about 35 parts of the alcohol-aryl sulfonamide-aldehyde reaction products per 100 parts of polyvinyl acetal resins may be used in conjunction with or in place of conventional plasticizers in the production of a superior laminating plastic.

Various additives may be incorporated in the polyvinyl acetal resin compositions of this invention, including fillers, pigments, dyes, curing agents, natural or synthetic resins including thermosetting resins which render the final composition thermosetting in nature.

Polyvinyl acetal resins modified with the aryl sulfonamide-aldehyde-alcohol derivatives may be used for bonding other materials such as ceramics, metal, wood, plastics, stone, etc. The compositions may be used in sheet or ribbon form or they may be dissolved in a solvent and coated on the object to be bonded by dipping, roll coating, brushing, spraying or other conventional methods. The compositions are thermoplastic and may be activated by heat and pressure to obtain a strong bond.

It is obvious that many variations may be made in the processes and products of this invention without departing from the spirit and scope thereof as defined in the appended claims.

What is claimed is:

1. A composition comprising a polyvinyl acetal resin, a plasticizer therefor and an aryl sulfonamide-formaldehyde-alcohol condensation product, the polyvinyl acetal resin having been prepared by reacting an aldehyde having the formula RCHO wherein R is taken from the group consisting of hydrogen and alkyl and phenyl radicals with a compound taken from the group consisting of completely hydrolyzed polyvinyl esters and partially hydrolyzed polyvinyl esters, said polyvinyl acetal resin being made up, on a weight basis, of 5–25% hydroxyl groups calculated as polyvinyl alcohol, 0–40% ester groups calculated as polyvinyl acetate, and the balance substantially acetal, and said aryl sulfonamide condensation product being the condensation product of a compound taken from the group consisting of benzene and toluene sulfonamides with formaldehyde and an unsubstituted aliphatic saturated alcohol containing from 1 to 8 carbon atoms.

2. A composition comprising a polyvinyl acetal resin and an aryl sulfonamide-formaldehyde-alcohol condensation product, the polyvinyl acetal resin having been prepared by reacting an aldehyde having the formula RCHO wherein R is taken from the group consisting of hydrogen and phenyl and alkyl radicals with a compound taken from the group consisting of completely hydrolyzed polyvinyl esters and partially hydrolyzed polyvinyl esters, said polyvinyl acetal resin being made up, on a weight basis, of 5–25% hydroxyl groups calculated as polyvinyl alcohol, 0–40% ester groups calculated as polyvinyl acetate and the balance substantially acetal, and said aryl sulfonamide condensation product being the condensation product of a compound taken from the group consisting of benzene and toluene sulfonamides with formaldehyde and an unsubstituted aliphatic saturated alcohol containing from 1 to 8 carbon atoms.

3. A laminated safety glass comprising two sheets of glass and a polyvinyl acetal resin interlayer, said interlayer having been modified with an aryl sulfonamide-formaldehyde-alcohol condensation product, the polyvinyl acetal resin having been prepared by reacting an aldehyde having the formula RCHO wherein R is taken from the group consisting of hydrogen and alkyl and phenyl radicals with a compound taken from the group consisting of completely hydrolyzed polyvinyl esters and partially hydrolyzed polyvinyl esters, said polyvinyl acetal resin being made up, on a weight basis, of 5-25% hydroxyl groups calculated as polyvinyl alcohol, 0-40% ester groups calculated as polyvinyl acetate, and the balance substantially acetal, and said aryl sulfonamide condensation product being the condensation product of a compound taken from the group consisting of benzene and toluene sulfonamides with formaldehyde and an unsubstituted aliphatic saturated alcohol containing from 1 to 8 carbon atoms.

4. A laminated safety glass comprising two sheets of glass and a polyvinyl acetal resin interlayer, said interlayer being modified with a plasticizer and from 0.5 to 5 parts per 100 parts of polyvinyl acetal resin of an aryl sulfonamide-formaldehyde-alcohol condensation product, the polyvinyl acetal resin having been prepared by reacting an aldehyde having the formula RCHO wherein R is taken from the group consisting of hydrogen and alkyl and phenyl radicals with a compound taken from the group consisting of completely hydrolyzed polyvinyl esters and partially hydrolyzed polyvinyl esters, said polyvinyl acetal resin being made up, on a weight basis, of 5-25% hydroxyl groups calculated as polyvinyl alcohol, 0-40% ester groups calculated as polyvinyl acetate and the balance substantially acetal, said aryl sulfonamide condensation product being the condensation product of a compound taken from the group consisting of benzene and toluene sulfonamides with formaldehyde and an unsubstituted aliphatic saturated alcohol containing from 1 to 8 carbon atoms.

5. A composition as in claim 2 wherein the polyvinyl acetal resin is a polyvinyl formaldehyde acetal resin, said polyvinyl formaldehyde acetal being made up on a weight basis of 5-8% hydroxyl groups calculated as polyvinyl alcohol, 10-16% acetate groups calculated as polyvinyl acetate and the balance substantially formaldehyde acetal.

6. A composition as in claim 2 wherein the polyvinyl acetal resin is a polyvinyl acetaldehyde acetal resin containing on a weight basis, 7% hydroxyl groups calculated as polyvinyl alcohol, 17% acetate groups calculated as polyvinyl acetate, and the balance substantially acetaldehyde acetal.

7. A composition as in claim 2 wherein the polyvinyl acetal resin is a polyvinyl butyraldehyde acetal resin containing on a weight basis 10-25% hydroxyl groups calculated as polyvinyl alcohol, 0-30% acetate groups calculated as polyvinyl acetate and the balance substantially butyraldehyde acetal.

8. A composition as in claim 2 wherein the alcohol is methanol.

9. A composition as in claim 2 wherein the alcohol is n-butanol.

10. A composition as in claim 2 wherein the alcohol is 2-ethyl hexanol.

FRANCIS T. BUCKLEY.
GEORGE R. SIDO.

REFERENCES CITED

The following references are of record in the file of this patent:

UNITED STATES PATENTS

| Number | Name | Date |
|---|---|---|
| 1,564,664 | Gardner | Dec. 8, 1925 |
| 2,045,130 | Fix | June 23, 1936 |
| 2,331,376 | D'Alelio | Oct. 12, 1943 |
| 2,332,898 | D'Alelio | Oct. 26, 1943 |
| 2,366,494 | D'Alelio | Jan. 2, 1945 |
| 2,420,730 | Woodward | May 20, 1947 |
| 2,433,098 | Debacher | Dec. 23, 1947 |

FOREIGN PATENTS

| Number | Country | Date |
|---|---|---|
| 347,777 | Great Britain | May 7, 1931 |
| 568,767 | Germany | Jan. 27, 1933 |